Jan. 22, 1952  J. H. WILHELM  2,583,402
SOUND PRODUCING DEVICE, ESPECIALLY FOR DOLLS
Filed May 19, 1947

INVENTOR.
JOHN H. WILHELM
BY James and Franklin

Patented Jan. 22, 1952

2,583,402

UNITED STATES PATENT OFFICE 2,583,402

SOUND PRODUCING DEVICE, ESPECIALLY FOR DOLLS

John H. Wilhelm, Hamilton Beach, N. Y., assignor to Voices, Inc., Bayonne, N. J., a corporation of Delaware Application May 19, 1947, Serial No. 749,000

11 Claims. (Cl. 46—187)

This invention relates to sound-producing devices, especially gravity-operated sound producing devices for dolls, and more particularly to such a device which is articulative.

The primary object of the present invention is to generally improve sound-producing devices of the specified character.

In a co-pending application of David Cohn and Charles Kusold, Serial No. 651,236, filed March 1, 1946, which resulted in Patent No. 2,558,237, June 26, 1951, there is disclosed a sound-producing device in which the conventional cloth bellows is replaced by a piston having a thin, flexible gasket so mounted that the piston may be used in an inexpensive cardboard cylinder. The gasket was so arranged that the piston moves slowly in one direction and rapidly in the other, thus providing a long drawn-out sound, and a rapid recovery.

The improvement described in the aforesaid co-pending application has proved beneficial and successful, particularly as applied to non-articulative sound-producing devices or so-called "criers." Said co-pending application suggests that the sound-producing device may be suitably valved to articulate a simple word such as "mama" or "papa." However, the proposed articulative voice, while successful, introduced several disadvantages. One was that the parts of the piston were not the same as the parts of the piston for the crier, it being necessary to provide room within the piston for reception of a stationary valve member. It is far better for manufacturing economy to employ parts which are standardized for both the crier and the articulative voice.

Another disadvantage was the tendency of the piston to tilt. The piston is purposely made quite loose in the cylinder because of the comparatively crude and inaccurate nature of the cylinder, and reliance is had on the thin, flexible gasket to provide the desired seal for compression of air. Any slight tilting of the piston has proved unimportant in the case of the crier, and irregular speed of movement has improved the desired wailing sound. However, in the case of the articulative voice the tilting of the piston affected the clearance between the stationary member of the valve and the valve ring which is slid over the same by movement of the piston. Also there is more friction to contend with in the case of the articulative voice, and uniform piston speed is more desirable.

One specific object of the present invention is to overcome the foregoing difficulties, and to minimize tilting of the piston. This is accomplished by the provision of a piston guide disc which is spaced from the piston by means of a tube, the disc and piston being connected in coaxial relation. The disc may be made inexpensively of thin sheet metal, with its periphery folded inward to provide a rounded edge.

This construction provides the equivalent of a very long piston, but does so at comparatively slight expense compared to the cost of making the piston itself of equivalent length. Moreover, in accordance with a further feature and object of the present invention, the combination of guide disc and tube carries, or itself acts as, a valve ring for cooperation with a stationary valve member. Thus the substantial spacing between the guide disc and the piston provides ample space within which the stationary valve member may be received, without necessitating any modification of the construction of the piston itself. For this reason the parts of the piston may be standardized and made interchangeable with the equivalent parts of the piston as used in an ordinary crier or non-articulative device.

To accomplish the foregoing general objects, and other more specific objects which will hereinafter appear, my invention resides in the sound-producing elements and their relation one to another, as are hereinafter more particularly described in the following specification. The specification is accompanied by a drawing, in which.

Figure 1:
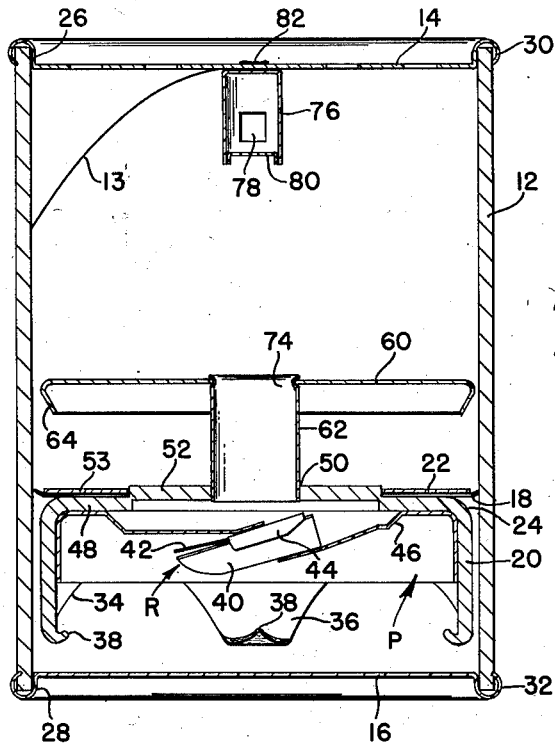
Fig. 1 is a section through an articulative sound-producing device, said section being taken approximately in the plane of the line 1—1 of Fig. 3.

Referring to the drawing, the sound-producing device comprises a cylinder 12 having end caps 14 and 16, the cap 14 being perforate, and the cap 16 being imperforate. There is also a weighty piston generally designated P which is loosely slidable in cylinder 12 and which carries a reed assembly R (Fig. 1). The piston has a flat circular gasket 18 which is made of a thin, flexible, non-porous material, and which preferably has a diameter only slightly greater than the inside diameter of the cylinder 12.

The piston comprises a piston body 20 and a support washer 22 between which the gasket 18 is held. The body 20 is preferably provided with a relieved edge 24 at the head end. The washer 22 is disposed in back of the gasket and preferably has a diameter only slightly smaller than the diameter of the gasket. Its diameter is preferably no smaller than the diameter of the body 20, and may even be, and preferably is, slightly larger in diameter. With this arrangement the gasket is supported by the washer 22 during the sound-producing movement of the piston, that is, during the downward movement in the piston shown in Fig. 1. This results in a slow descent of the piston toward the imperforate end. However, when the device is inverted for return movement, the gasket is free to fold about the relieved edge 24 of the body 20, thereby affording rapid return movement toward the perforate end of the sound-producing device. The edge 24 is most conveniently relieved by rounding it, as shown.

The cylinder 12 is preferably an inexpensive cardboard tube. Such a tube is relatively rough in surface, inaccurate in shape and dimension, and usually has a spiral seam (indicated at 13 in Fig. 1) because it is made of multiple spirally-wound laminations. In accordance with the present invention, the cardboard tube is supported in proper shape and dimension by the end caps 14 and 16. These caps are made of sheet metal, drawn or cupped to provide cylindrical portions 26 and 28 (Fig. 1) which fit within the cylinder to support the same. The edges 30 and 32 of the end caps are curled around the ends of the cylinder and into the outside of the cylinder opposite the cylindrical portions 26 and 28. These edges may be forced into the cardboard, thus securely anchoring the end caps in position, yet there is no danger of warping or deforming the cylinder because it is supported by the cylindrical parts 26 and 28.

Considering the arrangement in greater detail, the piston body 20 in the present case is formed of heavy gauge metal drawn to cup shape. A circular blank may be used, but in this case a square blank has been used in order to avoid waste of metal, and to take advantage of the extra weight of the corners. When this blank is drawn to cup shape the bottom edge is scalloped, as indicated at 34, but the deeper parts 36 effectively guide the piston. The lowermost corners are curled inwardly, as shown at 38, to avoid danger of catching against the inside wall of the cylinder.

The reed assembly R may be conventional, and requires no detailed description except to say that there is a metal channel 40 having a thin vibratile reed 42 clamped at one end on the open face of the channel by means of a metal clip 44. In the present case, this reed assembly is secured in an opening in a sheet metal reed holder 46, the latter being forced within the body 20 before the ends 38 are curled in. The reed assembly may be sealed in place with wax or cement. The head end 48 of the piston body 20 is provided with a sound discharge aperture 50, thus permitting air to flow through the reed assembly, and aperture 50, to the perforate end 14 of the casing.

To secure the gasket 18 and washer 22 in proper concentric relation with the body 20, in an inexpensive manner, a circular area of the heavy gauge metal of the head 48 is partly sheared and displaced outwardly, as indicated at 52. The gasket 18 is annular in shape and fits accurately around the upwardly projecting part 52, and the washer 22 is forced thereover with a force fit which locks the parts permanently together. The washer 22 is preferably made of thin sheet metal for economy.

The gasket 18 is made of a thin, flexible, non-porous material. I have found that a Vinylite web or membrane having a thickness of 4/1000ths of an inch is very suitable for the present purpose. The Vinylite film is preferably dusted or lightly coated with talcum powder or equivalent before being clamped between the piston body and the washer. This insures that the gasket will be free to flatten out instead of being caught or wrinkled during the assembly. It also helps provide the right contact friction between the gasket and the inside wall of the cylinder. In this connection, it may be explained that in the case of a "crier" a slight adhesion or frictional resistance is desirable not only for effective air seal, but also to slow down the movement of the piston, but the opposite may be true in the case of an articulative voice, because of the added friction of the valve mechanism. The material and treatment here specified are highly satisfactory for the present purpose. The diameter of the gasket is made slightly larger than the inside diameter of the cylinder, say, 15/1000ths of an inch.

In accordance with the present invention, the piston is provided with a piston guide disc 60 spaced from the head end 48 of the piston P. Tube 62 is employed to space the disc 60 and the piston in desired coaxial relation. The disc 60 in the example here shown is made of thin sheet metal, the periphery of which is folded inwardly as shown at 64 to provide a rounded edge.

The diameter of the guide disc is substantially the same as the diameter of the piston. It will be noted that it is spaced from the piston so far that it practically doubles the effective over-all length of the piston.

As so far described, the sound-producing device would be a crier, and the guide disc improvement might be used with a crier, and for that matter, with a device using a bellows, but the invention is most useful with an articulative voice with no bellows. For articulation, the disc and tube combination 60, 62 carries a valve ring 74. In the specific structure here shown, the tube 62 is spun inwardly to smaller diameter, so that the end of tube 62 itself acts as the valve ring. This inwardly spun portion 74 serves the added function of securely anchoring the disc 60 in position on the tube.

Figure 4:
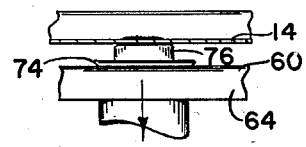
Figs. 4, 5 and 6 are fragmentary views explanatory of the operation of the valve mechanism.
Figure 5:
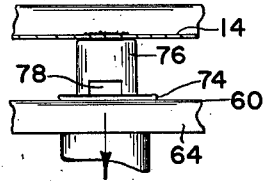
Figure 2:
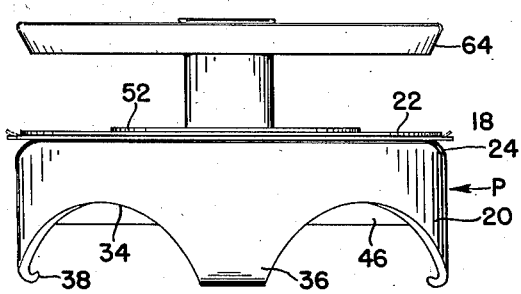
Fig. 2 is an elevation of the piston and piston guide disc.
Figure 6:
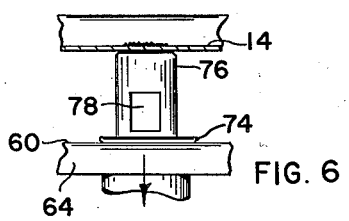

The ring 74 is dimensioned to cooperate with a stationary valve member 76 secured to the perforate end 14 of the cylinder. The valve member 76 has a cylindrical wall, with apertures at 78, and is closed at the lower end 80. Assuming the weight is at the top, and descending, it will be seen that the sound discharge will be constricted or modulated while the ring 74 surrounds the imperforate upper end of valve member 76, as shown in Fig. 4. This will simulate the consonant "m." The sound discharge will be free when the ring 74 is located at the apertures 78, as shown in Fig. 5, and the vowel "a" will be simulated. When the ring 74 surrounds the closed or imperforate end of the valve member 76, as shown in Fig. 6, the sound discharge will again be constricted and the consonant "m" will again be sounded. After the ring 74 leaves the lower end of the valve member 76 the sound discharge will again be free and unobstructed, as shown in Fig. 1, and the vowel "a" will again be simulated. In all, the word "mama" will be produced.

Figure 3:
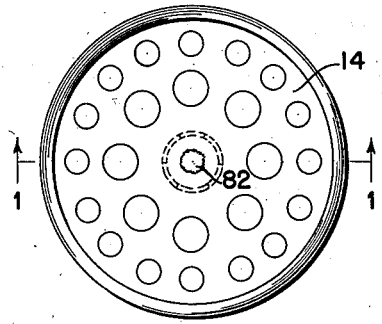
Fig. 3 shows the perforate end of the sound-producing device.

In the particular construction here shown, the stationary valve member 76 is secured to the perforate cap 14 by spot-welding, indicated at 82 in Figs. 1 and 3. The spot-welding operation may be performed before the addition of the closure 80. The latter may be inserted with a press fit or force fit.

The lower end of the tube 62 is secured to the head end 48 of the piston by a force fit or press fit, the hole in the piston being slightly smaller than that needed to receive the tube. Other and more elaborate methods of attaching the tube to the piston may be provided, but that here shown has proved both satisfactory and inexpensive.

It is believed that the construction and operation as well as the advantages of my improved sound-producing device, will be apparent from the foregoing detailed description thereof. Although some preferred materials have been named, it is not essential that the cylinder be cardboard, or the end caps metal, or the gasket Vinylite, etc. It will also be apparent that while I have shown and described my invention in a preferred form, changes may be made in the structure disclosed, without departing from the spirit of the invention, as ought to be defined in the following claims.

I claim:

1. A sound-producing device comprising a hollow cylinder, one end of said cylinder being imperforate and the other being perforate, a piston loosely slidable in said cylinder and carrying a reed assembly, said piston having a body, a gasket, and a gasket-support washer, said body fitting said cylinder loosely, the gasket being mounted on the head end of the piston and being made of a thin, flexible, non-porous material, said gasket-support washer being disposed over said gasket, a piston guide disc spaced from the head end of said piston and having approximately the same diameter as said piston, and a tube connecting said piston and guide disc in coaxial and fixed spaced relation for movement together.

2. A sound-producing device comprising a hollow cylinder, one end of said cylinder being imperforate and the other being perforate, a piston loosely slidable in said cylinder and carrying a reed assembly, said piston having a body, a gasket, and a gasket-support washer, said body fitting said cylinder loosely and having a relieved edge at the head end facing the perforate cap, the gasket being mounted on said head end and having a diameter only slightly greater than that of the cylinder, said gasket being made of a thin, flexible, non-porous material, said gasket-support washer being disposed over said gasket and having a diameter slightly smaller than that of the gasket, a piston guide disc spaced from the head end of said piston and having approximately the same diameter as said piston, and a tube connecting said piston and guide disc in coaxial and fixed spaced relation for movement together.

3. A sound-producing device comprising a hollow cardboard cylinder with sheet-metal end caps, one of said caps being imperforate and the other being perforate, a piston loosely slidable in said cylinder and carrying a reed assembly, said piston having a body, a gasket, and a gasket-support washer, said body fitting said cardboard cylinder loosely, the gasket being mounted on the head end of the piston and being made of a thin, flexible, non-porous material, said gasket-support washer being disposed over said gasket, a piston guide disc spaced from the head end of said piston and having approximately the same diameter as said piston, and a tube connecting said piston and disc in coaxial and fixed spaced relation for movement together, said piston guide disc being formed of thin sheet metal and having its peripihery bent to provide a rounded edge.

4. An articulative sound-producing device comprising a hollow cylinder, and a piston slidable in said cylinder and carrying a reed assembly, one end of said cylinder having a stationary valve member, the side of said piston adjacent said valve member having a piston guide disc of approximately the same diameter as the piston, and a tube having a diameter substantially smaller than the piston connecting and spacing apart in fixed relation said piston and guide disc for movement together, said tube providing a valve ring as an integral part thereof for sliding cooperation with the aforesaid stationary valve member, said valve ring and stationary valve member being in coaxial alignment.

5. An articulative sound-producing device comprising a hollow cylinder, and a piston slidable in said cylinder and carrying a reed assembly, one end of said cylinder havng a statonary valve member, the side of said piston adjacent said valve member having a piston guide disc of approximately the same diameter as the piston, said disc being made of sheet metal and having its periphery bent inward to provide a rounded edge, and a tube having a diameter substantially smaller than the piston connecting and spacing apart in fixed relation said piston and guide disc for movement together, said tube providing a valve ring as an integral part thereof for sliding cooperation with the aforesaid stationary valve member, said valve ring and stationary valve member being in coaxial alignment.

6. An articulative sound-producing device comprising a hollow cardboard cylinder with sheet metal end caps, one of said caps being imperforate and the other perforate, and a piston slidable in said cylinder and carrying a reed assembly, the perforate end of said cylinder having a stationary valve member, the side of said piston adjacent said valve member having a piston guide disc of approximately the same diameter as the piston, said disc being made of sheet metal and having its periphery bent inward to provide a rounded edge, and a tube having a diameter substantially smaller than the piston connecting and spacing apart in fixed relation, said piston and guide disc for movement together, the end of said tube being reduced in diameter to form a valve ring as an integral part thereof for sliding cooperation with the aforesaid stationary valve member, said valve ring and stationary valve member being in coaxial alignment.

7. An articulative sound-producing device comprising a hollow cylinder, one end of said cylinder being imperforate and the other perforate, a piston slidable in said cylinder and carrying a reed assembly, said piston having a body, a gasket and a gasket-support washer at the end of the piston facing the perforate end of the cylinder, said body fitting said cardboard cylinder loosely, the gasket being made of a thin, flexible, non-porous material, and said support washer being disposed over said gasket, the perforate end of said cylinder having a stationary valve member, the gasket end of said piston having a piston guide disc of approximately the same diameter as the piston, and a tube connecting and spacing apart in fixed relation said piston and guide disc for movement together, said tube and disc combination carrying a valve ring in coaxial alignment with the stationary valve member for sliding cooperation with the aforesaid stationary valve member.

8. An articulative sound-producing device comprising a hollow cylinder, one end of said cylinder being imperforate and the other perforate, a piston slidable in said cylinder and carrying a reed assembly, said piston having a body, a gasket and a gasket-support washer, said body fitting said cardboard cylinder loosely and having a relieved edge at the end facing the perforate cap, the gasket being mounted on said end and having a diameter slightly greater than that of the cylinder, said gasket being made of a thin, flexible, non-porous material, and said support washer being disposed over said gasket and having a diameter slightly smaller than that of the gasket, the perforate end of said device having a stationary valve member, the gasket end of said piston having a piston guide disc of approximately the same diameter as the piston, and a tube connecting and spacing apart in fixed relation said piston and guide disc for movement together, said tube and disc combination carrying a valve ring in coaxial alignment with the stationary valve member for sliding cooperation with the aforesaid stationary valve member.

9. An articulative sound-producing device comprising a hollow cylinder, one end of said cylinder being imperforate and the other perforate, a piston slidable in said cylinder and carrying a reed assembly, said piston having a body, a gasket and a gasket-support washer, said body fitting said cardboard cylinder loosely and having a relieved edge at the end facing the perforate cap, the gasket being mounted on said end and having a diameter slightly greater than that of the cylinder, said gasket being made of a thin, flexible, non-porous material, and said support washer being disposed over said gasket and having a diameter slightly smaller than that of the gasket, the perforate end of said device having a stationary valve member, the gasket end of said piston having a piston guide disc of approximately the same diameter as the piston, said disc being made of sheet metal with its periphery bent inward to provide a rounded edge, and a tube connecting and spacing apart in fixed relation said piston and guide disc for movement together, said tube and disc combination carrying a valve ring in coaxial alignment with the stationary valve member for sliding cooperation with the aforesaid stationary valve member.

10. An articulative sound-producing device comprising a hollow cardboard cylinder with sheet metal end caps, one of said caps being imperforate and the other perforate, a piston slidable in said cylinder and carrying a reed assembly, said piston having a body, a gasket and a gasket-support washer at the end of the piston facing the perforate end of the cylinder, said body fitting said cardboard cylinder loosely, the gasket being made of a thin, flexible, non-porous material, and said support washer being disposed over said gasket, the perforate end of said device having secured thereto a stationary valve member, the gasket end of said piston having a piston guide disc of approximately the same diameter as the piston, said disc being made of sheet metal and having its periphery bent inward to provide a rounded edge, and a tube connecting and spacing apart in fixed relation said piston and guide disc for movement together, said tube and disc combination carrying a valve ring in coaxial alignment with the stationary valve member for sliding cooperation with the aforesaid stationary valve member.

11. An articulative sound-producing device comprising a hollow cardboard cylinder with sheet metal end caps, one of said caps being imperforate and the other perforate, a piston slidable in said cylinder and carrying a reed assembly, said piston having a body, a gasket and a gasket-support washer, said body fitting said cardboard cylinder loosely and having a relieved edge at the end facing the perforate cap, the gasket being mounted on said end and having a diameter only slightly greater than that of the cylinder, said gasket being made of a thin, flexible, non-porous material, and said support washer being disposed over said gasket and having a diameter only slightly smaller than that of the gasket, the perforate end of said device having a stationary valve member, the gasket end of said piston having a piston guide disc of approximately the same diameter as the piston, said disc being made of sheet metal with its periphery bent inward to provide a rounded edge, and a tube connecting and spacing apart in fixed relation said piston and guide disc for movement together, the end of said tube being reduced in diameter to form a valve ring in coaxial alignment with the stationary valve member for sliding cooperation with the aforesaid stationary valve member.

JOHN H. WILHELM.

REFERENCES CITED

The following references are of record in the file of this patent:

UNITED STATES PATENTS

| Number | Name | Date |
|---|---|---|
| 574,534 | Gibson | Jan. 5, 1897 |
| 1,229,757 | Knapp | Jan. 12, 1917 |
| 1,466,877 | Grubman | Sept. 4, 1923 |
| 1,503,518 | Schneider | Aug. 5, 1924 |
| 1,568,275 | Grubman | Jan. 5, 1926 |
| 1,590,188 | Grubman | June 29, 1926 |
| 1,642,956 | Hutnikow | Sept. 20, 1927 |
| 1,667,093 | Aronson | Apr. 24, 1928 |
| 1,667,353 | Lloyd | Apr. 24, 1928 |
| 2,299,023 | Marcus | Oct. 13, 1942 |